(12) United States Patent
Zhang et al.

(10) Patent No.: US 12,050,870 B2
(45) Date of Patent: Jul. 30, 2024

(54) CROSS-LINGUAL ZERO-SHOT TRANSFER VIA SEMANTIC AND SYNTHETIC REPRESENTATION LEARNING

(71) Applicant: NEC Laboratories America, Inc., Princeton, NJ (US)

(72) Inventors: Xuchao Zhang, Elkridge, MD (US); Yanchi Liu, Monmouth Junction, NJ (US); Bo Zong, West Windsor, NJ (US); Wei Cheng, Princeton Junction, NJ (US); Haifeng Chen, West Windsor, NJ (US); Junxiang Wang, Fairfax, VA (US)

(73) Assignee: NEC Corporation, Tokyo (JP)

( * ) Notice: Subject to any disclaimer, the term of this patent is extended or adjusted under 35 U.S.C. 154(b) by 358 days.

(21) Appl. No.: 17/464,005

(22) Filed: Sep. 1, 2021

(65) Prior Publication Data
US 2022/0075945 A1 Mar. 10, 2022

Related U.S. Application Data

(60) Provisional application No. 63/075,442, filed on Sep. 8, 2020.

(51) Int. Cl.
*G06F 40/284* (2020.01)
*G06F 40/205* (2020.01)
(Continued)

(52) U.S. Cl.
CPC .......... *G06F 40/284* (2020.01); *G06F 40/205* (2020.01); *G06F 40/295* (2020.01); *G06N 3/04* (2013.01)

(58) Field of Classification Search
CPC .... G06F 40/284; G06F 40/205; G06F 40/295; G06N 3/04; G06N 3/045; G06N 3/08
See application file for complete search history.

(56) References Cited

U.S. PATENT DOCUMENTS

| 11,531,812 B2 * | 12/2022 | Xia | G06F 40/284 |
| 2022/0067579 A1 * | 3/2022 | Choi | G06N 5/02 |
| 2022/0246136 A1 * | 8/2022 | Yang | G10L 13/047 |

OTHER PUBLICATIONS

Subburathinam et al., Cross-lingual Structure Transfer for Relation and Event Extraction, Nov. 2019, Proceedings of the 2019 Conference on Empirical Methods in Natural Language Processing and the 9th International Joint Conference on Natural Language Processing, pp. 313-325, (Year: 2019).*

(Continued)

*Primary Examiner* — Bhavesh M Mehta
*Assistant Examiner* — Darioush Agahi
(74) *Attorney, Agent, or Firm* — Joseph Kolodka

(57) ABSTRACT

A computer-implemented method is provided for cross-lingual transfer. The method includes randomly masking a source corpus and a target corpus to obtain a masked source corpus and a masked target corpus. The method further includes tokenizing, by pretrained Natural Language Processing (NLP) models, the masked source corpus and the masked target corpus to obtain source tokens and target tokens. The method also includes transforming the source tokens and the target tokens into a source dependency parsing tree and a target dependency parsing tree. The method additionally includes inputting the source dependency parsing tree and the target dependency parsing tree into a graph encoder pretrained on a translation language modeling task to extract common language information for transfer. The method further includes fine-tuning the graph encoder and a down-stream network for a specific NLP down-stream task.

20 Claims, 6 Drawing Sheets

(51) Int. Cl.
G06F 40/295 (2020.01)
G06N 3/04 (2023.01)

(56) References Cited

OTHER PUBLICATIONS

Conneau et al. "Cross-lingual Language Model Pretraining" arXiv preprint arXiv:1901.07291, 2019•arxiv.org (Year: 2019).*

Dong et al. "A Robust Self-Learning Framework for cross-Lingual Text Classification" (Year: 2019).*

Marcheggiani et al. "Encoding Sentences with Graph Convolutional Networks for Semantic Role Labeling", Proceedings of the 2019 Conference on Empirical Methods in Natural Language Processing and the 9th International Joint Conference on Natural Language Processing, pp. 6306-6310, (Year: 2017).*

Artetxe, Mikel, et al. "On the cross-lingual transferability of monolingual representations", arXiv preprint arXiv:1910.11856. May 26, 2020, pp. 1-15.

Chi, Ethan A., et al. "Finding universal grammatical relations in multilingual BERT", Proceedings of the 58th Annual Meeting of the Association for Computational Linguistics. Jul. 2020, pp. 5564-5577.

Goyal, Naman, et al. "Unsupervised cross-lingual representation learning at scale", Proceedings of the 58th Annual Meeting of the Association for Computational Linguistics. Jul. 2020, pp. 8440-8451.

Li, Zheng, et al. "Learn to cross-lingual transfer with meta graph learning across heterogeneous languages", InProceedings of the 2020 Conference on Empirical Methods in Natural Language Processing (EMNLP). Nov. 2020, pp. 2290-2301.

Eskander, Ramy, et al. "Unsupervised Cross-Lingual Part-of-Speech Tagging for Truly Low-Resource Scenarios", InProceedings of the 2020 Conference on Empirical Methods in Natural Language Processing (EMNLP). Nov. 2020, pp. 4820-4831.

Cai, Deng, et al. "Graph transformer for graph-to-sequence learning", InProceedings of the AAAI Conference on Artificial Intelligence, vol. 34, No. 05. Apr. 3, 2020, pp. 7464-7471.

Chen, Kehai, et al. "Syntax-directed attention for neural machine translation", InProceedings of the AAAI Conference on Artificial Intelligence, vol. 32, No. 1. Apr. 26, 2018, pp. 4792-4799.

Lee, Kyungjae, et al. "Learning with limited data for multilingual reading comprehension", InProceedings of the 2019 Conference on Empirical Methods in Natural Language Processing and the 9th International Joint Conference on Natural Language Processing (EMNLP-IJCNLP). Nov. 2019, pp. 2840-2850.

Dong, Xin, et al. "A robust self-learning framework for cross-lingual text classification", InProceedings of the 2019 Conference on Empirical Methods in Natural Language Processing and the 9th International Joint Conference on Natural Language Processing (EMNLP-IJCNLP). Nov. 2019, pp. 6306-6310.

Damonte, Marco, et al. "Structural neural encoders for AMR-to-text generation", Proceedings of NAACL-HLT 2019. Jun. 2019, pp. 3649-3658.

Conneau, Alexis, et al. "Cross-lingual language model pretraining", 33rd Conference on Neural Information Processing Systems (NeurIPS 2019). Dec. 8, 2019, pp. 1-11.

Dai, Zihang, et al. "Transformer-xl: Attentive language models beyond a fixed-length context", Proceedings of the 57th Annual Meeting of the Association for Computational Linguistics. Jul. 2019, pp. 2978-2988.

* cited by examiner

US 12,050,870 B2

CROSS-LINGUAL ZERO-SHOT TRANSFER VIA SEMANTIC AND SYNTHETIC REPRESENTATION LEARNING

RELATED APPLICATION INFORMATION

This application claims priority to U.S. Provisional Patent Application Ser. No. 63/075,442, filed on Sep. 8, 2020, incorporated herein by reference in its entirety.

BACKGROUND

Technical Field

The present invention relates to machine learning and more particularly to cross-lingual zero-shot transfer via semantic and synthetic representation learning.

Description of the Related Art

Most languages (except English) have limited labels, and cannot be applied to existing Natural Language Processing (NLP) models. A cross-lingual model takes both high-resource languages and low-resource languages as inputs. A zero-shot transfer problem makes predictions on the unlabeled languages, while training on the high-resource languages for which abundant training labels exist. Cross-lingual transfer methods perform poorly on some NLP tasks such as syntactic tasks. Hence, there is a need for an improved approach to cross-lingual zero-shot transfer.

SUMMARY

According to aspects of the present invention, a computer-implemented method is provided for cross-lingual transfer. The method includes randomly masking a source corpus and a target corpus to obtain a masked source corpus and a masked target corpus. The method further includes tokenizing, by pretrained Natural Language Processing (NLP) models, the masked source corpus and the masked target corpus to obtain source tokens and target tokens. The method also includes transforming the source tokens and the target tokens into a source dependency parsing tree and a target dependency parsing tree. The method additionally includes inputting the source dependency parsing tree and the target dependency parsing tree into a graph encoder pretrained on a translation language modeling task to extract common language information for transfer. The method further includes fine-tuning the graph encoder and a down-stream network for a specific NLP down-stream task.

According to other aspects of the present invention, a computer program product is provided for cross-lingual transfer. The computer program product includes a non-transitory computer readable storage medium having program instructions embodied therewith. The program instructions are executable by a computer to cause the computer to perform a method. The method includes randomly masking a source corpus and a target corpus to obtain a masked source corpus and a masked target corpus. The method further includes tokenizing, by pretrained Natural Language Processing (NLP) models, the masked source corpus and the masked target corpus to obtain source tokens and target tokens. The method also includes transforming the source tokens and the target tokens into a source dependency parsing tree and a target dependency parsing tree. The method additionally includes inputting the source dependency parsing tree and the target dependency parsing tree into a graph encoder pretrained on a translation language modeling task to extract common language information for transfer. The method further includes fine-tuning the graph encoder and a down-stream network for a specific NLP down-stream task.

According to yet other aspects of the present invention, a computer processing system is provided for cross-lingual transfer. The computer processing system includes a memory device for storing program code. The computer processing system further includes a processor device operatively coupled to the memory device for running the program code to randomly mask a source corpus and a target corpus to obtain a masked source corpus and a masked target corpus. The processor device further runs the program code to tokenize, by pretrained Natural Language Processing (NLP) models, the masked source corpus and the masked target corpus to obtain source tokens and target tokens. The processor device also runs the program code to transform the source tokens and the target tokens into a source dependency parsing tree and a target dependency parsing tree. The processor device additionally runs the program code to input the source dependency parsing tree and the target dependency parsing tree into a graph encoder pretrained on a translation language modeling task to extract common language information for transfer. The processor device further runs the program code to fine-tune the graph encoder and a down-stream network for a specific NLP down-stream task.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to cross-lingual zero-shot transfer via semantic and synthetic representation learning.

Embodiments of the present invention, given limited unlabeled corpus from low-resource languages, aim to solve the Natural Language Processing (NLP) down-stream tasks by knowledge transfer from high-resource languages, which have a large number of labelled corpora.

Embodiments of the present invention focus on the following settings: labelled corpus from high-resource languages and unlabeled corpora from low-resource languages; source corpus and target corpus from high-resource languages and low-resource languages, and a goal to transfer knowledge from high resource languages to low-resource languages in the NLP down-stream tasks.

Embodiments of the present invention provide a Graph Convolutional Network (GCN)-based transfer learning approach to address the cross-lingual zero-shot transfer problem. Exemplary high-level steps of the present invention can involve the following:

Step 1. Corpus Transformation: the source corpus and the target corpus are tokenized by pre-trained NLP models. Then they are transformed to dependency parsing trees.

Step 2. Graph Encoder Pretraining: dependency parsing trees in Step 1 are fed to a graph encoder, which is pretrained on the Translation Language Modeling (TLM) task.

Step 3. Fine Tuning: the graph encoder and the downstream network are fine-tuned for specific NLP downstream tasks such as Named Entity Recognition (NER). They are trained in the labelled high-resource languages and evaluated in the low-resource languages.

As used herein, the term "high-resource language" refers to a language for which labels exists for most (e.g., more than half up to all) of the words in the language. Also as used herein, the term "low-resource language" refers to a language for which a very limited number, if any, (e.g., less than half) labels exist for each of the words in the language.

Figure 1:
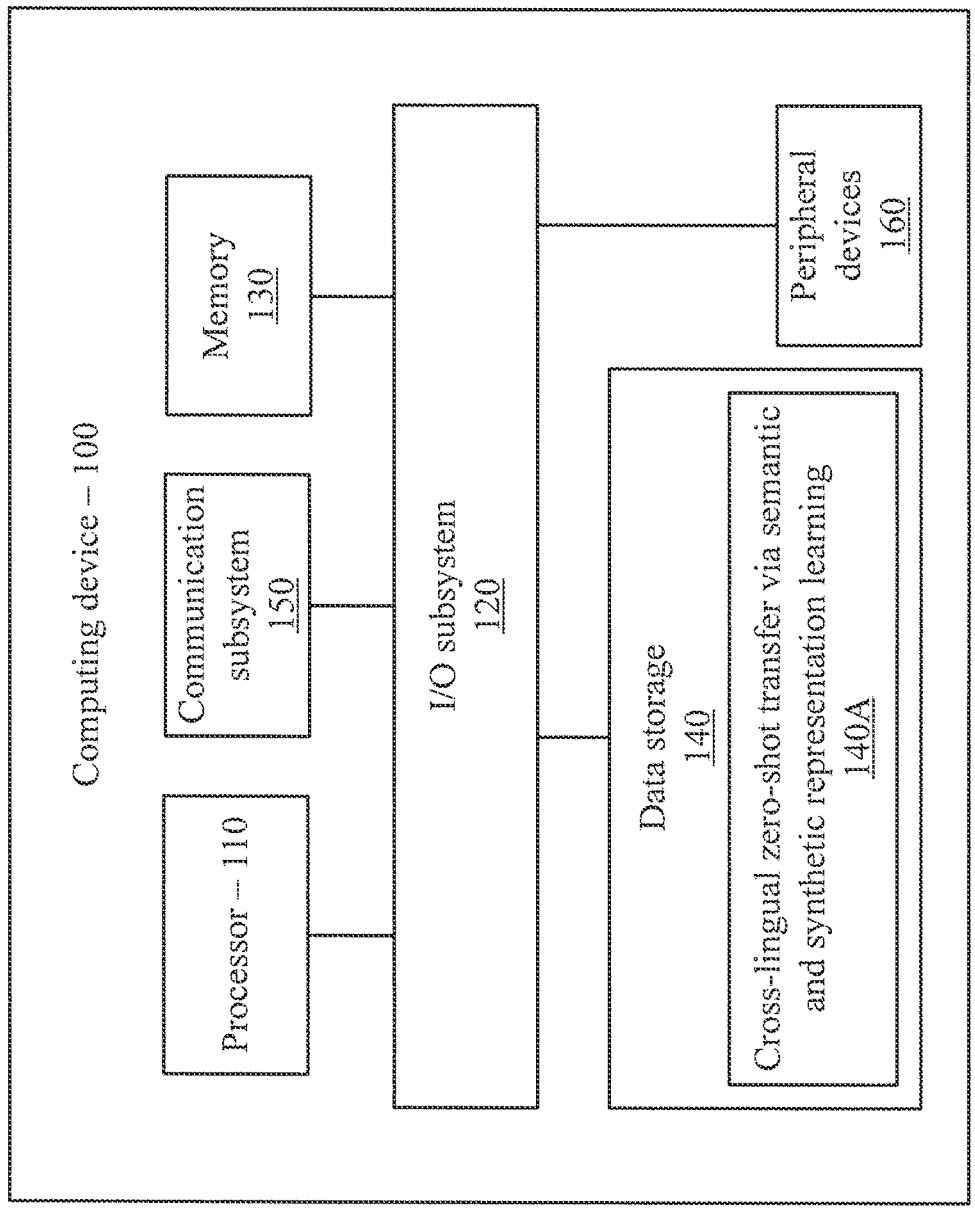
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform cross-lingual zero-shot transfer via semantic and synthetic representation learning.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for cross-lingual zero-shot transfer via semantic and synthetic representation learning. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
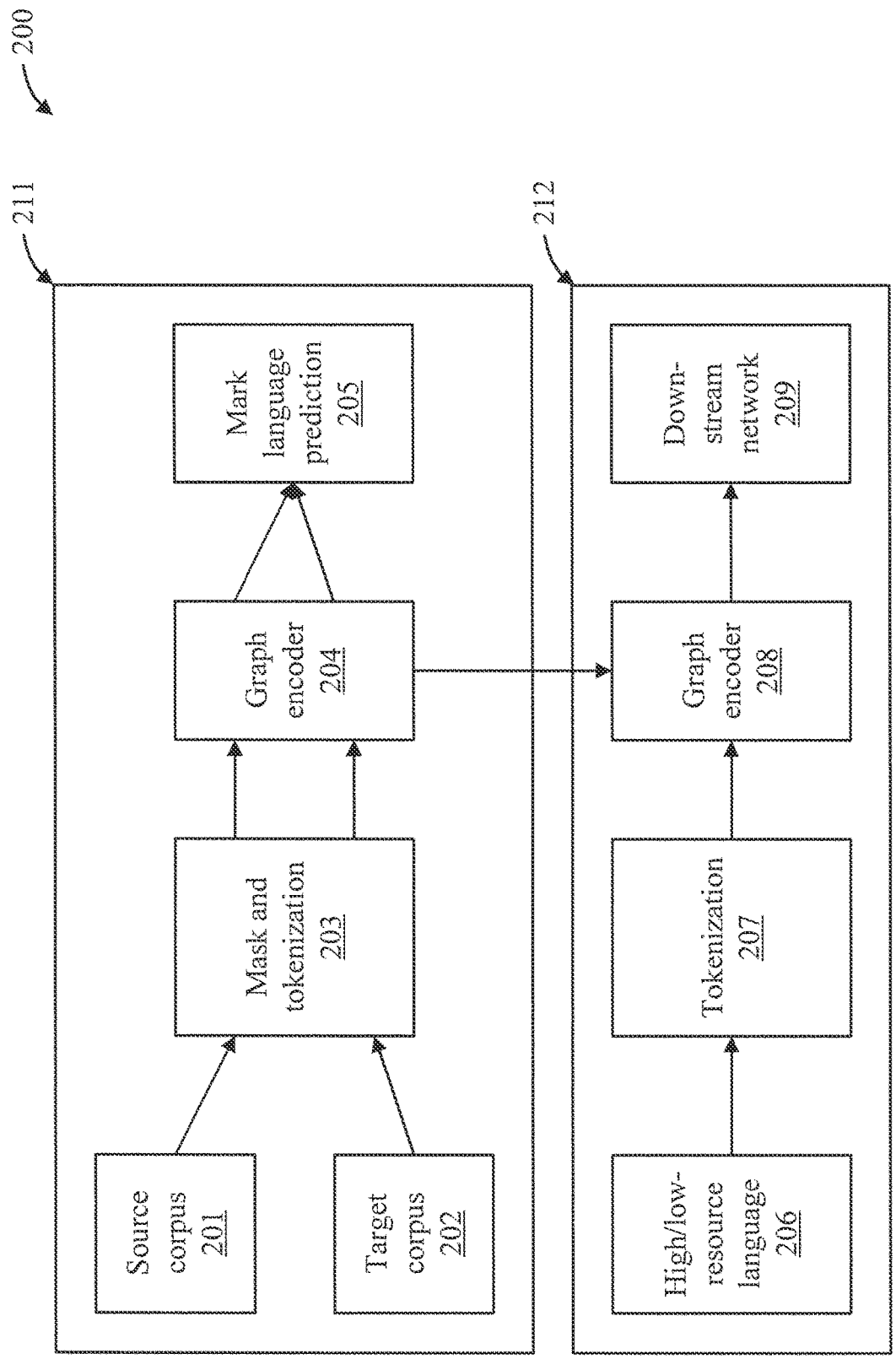
FIG. 2 is a high-level block/flow diagram showing an exemplary system/method for cross-lingual zero-shot transfer, in accordance with an embodiment of the present invention.

These and other variations of a hardware processor subsystem are also contemplated in accordance with embodiments of the present invention FIG. 2 is a high-level block/flow diagram showing an exemplary system/method 200 for cross-lingual zero-shot transfer, in accordance with an embodiment of the present invention.

The system/method 200 includes a source corpus block/step 201, a target corpus block/step 202, a mask and tokenization block/step 203, a graph encoder block/step 204, a mask language prediction block/step 205, a high-low-resource language block/step 206, a tokenization block/step 207, a graph encoder block/step 208, and a down-stream network block/step 209. The preceding items may be hereinafter referred to in short without reference to one or both of "block" or "step". The source corpus 201, target corpus 202, mask and tokenization block 203, graph encoder 204, and mask language prediction block 205 form a structural translation language model 211. The high-low-resource language 206, tokenization block 207, graph encoder 208, and down-stream network 209 form a down-stream task model 212.

The source corpus 201 is a collection of multi-lingual texts. All texts are written in natural languages.

The target corpus 202 is a collection of multi-lingual texts. It is a translation of the source corpus, and is written in natural languages.

Regarding mark and tokenization block/step 203, the source corpus 201 and target corpus 202 are randomly masked, tokenized by pretrained NLP models, and are transformed to representations of dependency parsing trees. Features of tree nodes include three categories as follows: (1) token representation by the NLP pretrained models; (2) Part-Of-Speech (POS) tagging; and (3) Universal Dependency (UD) relation.

Regarding graph encoder 204, a GCN is designed as a graph encoder for knowledge transfer. This GCN includes two graph convolution layers, which can be represented by the following:

$$H_s^1 = \max(A_s H_s^0 W_1 + b_1, 0), H_t^1 = \max(A_t H_t^0 W_1 + b_1, 0)$$

$$H_s^2 = A_s H_s^1 W_2 + b_2, H_t^2 = A_t H_t^1 W_2 + b_2$$

where $W_1$ and $W_2$ are weights of the first and second graph convolution layers, respectively, $b_1$ and $b_2$ are biases of the first and second graph convolution layers, respectively, $A_s$ and $A_t$ are adjacency matrices of dependency parsing trees of the source corpus and the target corpus, respectively. $H_s^0$ and $H_t^0$ are inputs of the source corpus and the target corpus, respectively. $H_s^1$ and $H_t^1$ are outputs of the source corpus and the target corpus on the first graph convolution layer, respectively. $H_s^2$ and $H_t^2$ are outputs of the source corpus and the target corpus on the second graph convolution layer, respectively. It is an initialization of the graph encoder in step/block 208.

Regarding mask language prediction block/step 205, in the step/block, $H_s^2$ and $H_t^2$ are concatenated and denoted as $X=[H_s^2 H_t^2]$. The TLM task is trained in this step: it is a filling-in-blank task where the mask tokens are predicted by the model according to their surrounding context of words. To achieve this, a two-layer fully connect neural network is built, which is as follows:

$$a^1 = g_1(X), a^2 = g_2(a^1)$$

where $g_1(\bullet)$ is a linear function with dropout, $g_2(\bullet)$ is a SoftMax function in the output layer, and $a^1$ and $a^2$ are outputs of the first and the second layers, respectively.

Regarding the high/low-resource languages 206, the same are used to train the down-stream task model with their available labels, while the low-resource languages are used to evaluate the down-stream task model.

Regarding tokenization block/step 207, high/low-resource languages are tokenized by pretrained NLP models, and are transformed to representations of dependency parsing trees. Features of tree nodes are the same as the one in step/block 203.

Regarding the graph encoder 208, the same is trained with labeled high-resource languages. The architecture of the graph encoder is the same as the one in step/block 202, which initializes this graph encoder in the training of down-stream tasks.

Regarding the down-stream network block/step 209, the same is used for NLP down-stream tasks such as Named Entity Recognition (NER). It is trained with labeled high-resource languages. The trained down-stream network and the trained graph encoder in step/block 208 are evaluated on the low-resource languages. To achieve down-stream tasks, a two-layer fully connect neural network is built as follows:

$$d^1 = h_1(x), d^2 = h_2(d^1)$$

where x is an input, $h_1(\bullet)$ is a linear function with dropout, $h_2(\bullet)$ is a SoftMax function in the output layer, and $d^1$ and $d^2$ are outputs of the first and the second layers, respectively.

Figure 3:
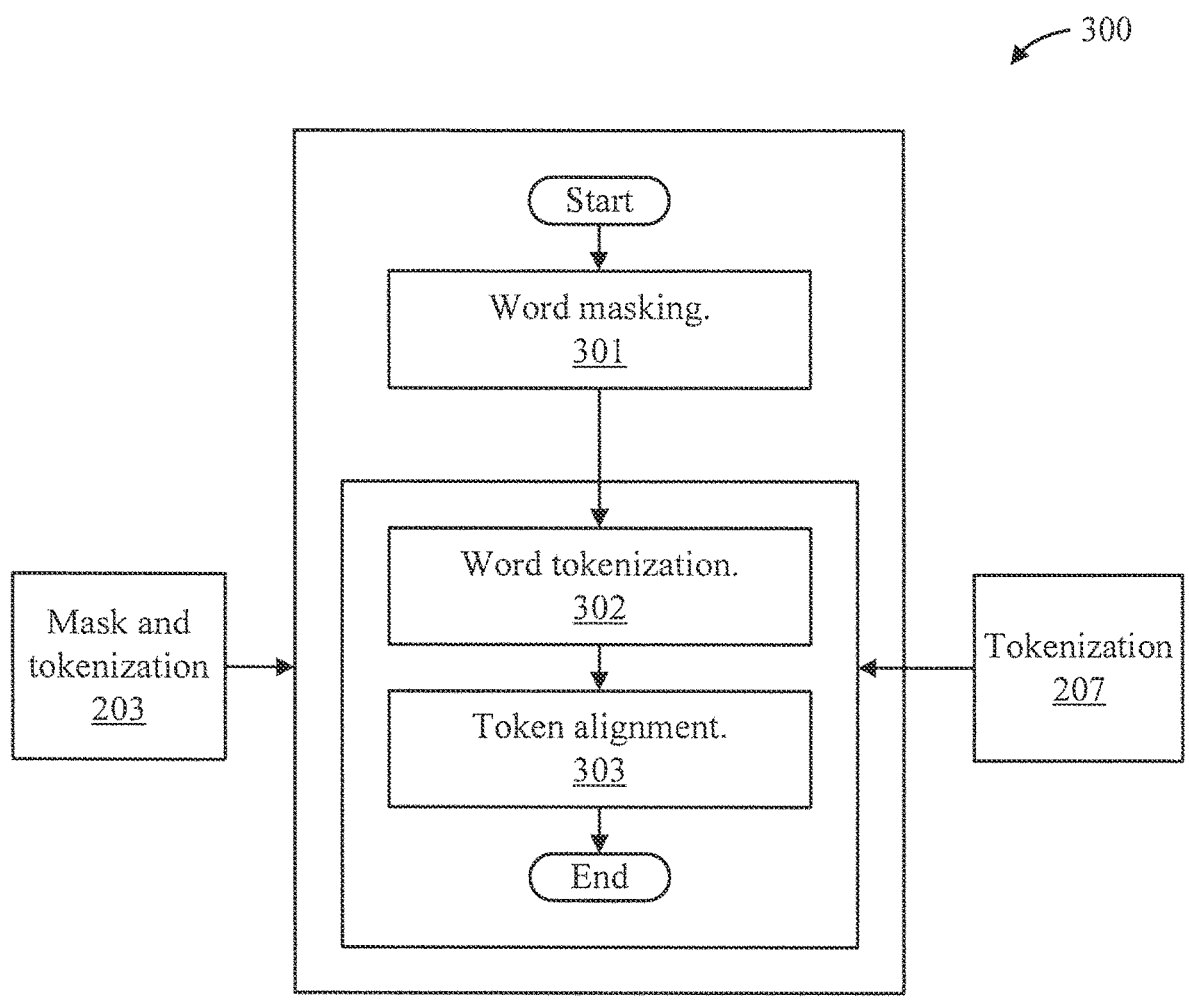
FIG. 3 is a high-level block/flow diagram further showing block/step 203 and block/step 207 of FIG. 2, in accordance with an embodiment of the present invention.

FIG. 3 is a high-level block/flow diagram further showing block/step 203 and block/step 207 of FIG. 2, in accordance with an embodiment of the present invention.

FIG. 3 involves a work masking block/step 301, a work tokenization block/step 302, and a token alignment block/step 303.

As shown, the procedure of block/step 203 includes blocks/steps 301-303, while the procedure of block/step 207 includes blocks/steps 302-303.

Regarding the word masking block/step 301, in this block/step each word in the source corpus and the target corpus are tokenized as tree nodes by dependency parsing trees, and then at least 15% of tokens are randomly masked. The masking strategy is shown as follows:
- 80% of mask tokens are changed to the token "[MASK]".
- 10% of mask tokens are changed to any random token.
- 10% of mask tokens remain unchanged.

Regarding the work tokenization block/step 302, in this block/step each word in the high/low-resource languages in block/step 207 is tokenized as tree nodes of dependency parsing trees. Moreover, each sentence in the natural language texts (i.e., source corpus and target corpus in block/step 203, and high/low-resource languages in block/step 207) are tokenized by the NLP pretrained models in order to obtain token representation.

Regarding token alignment block/step 303, in this block/step tokens obtained by block/step 302 are aligned to tree nodes of dependency parsing trees, which can be achieved by a convolution neural network.

Figure 4:
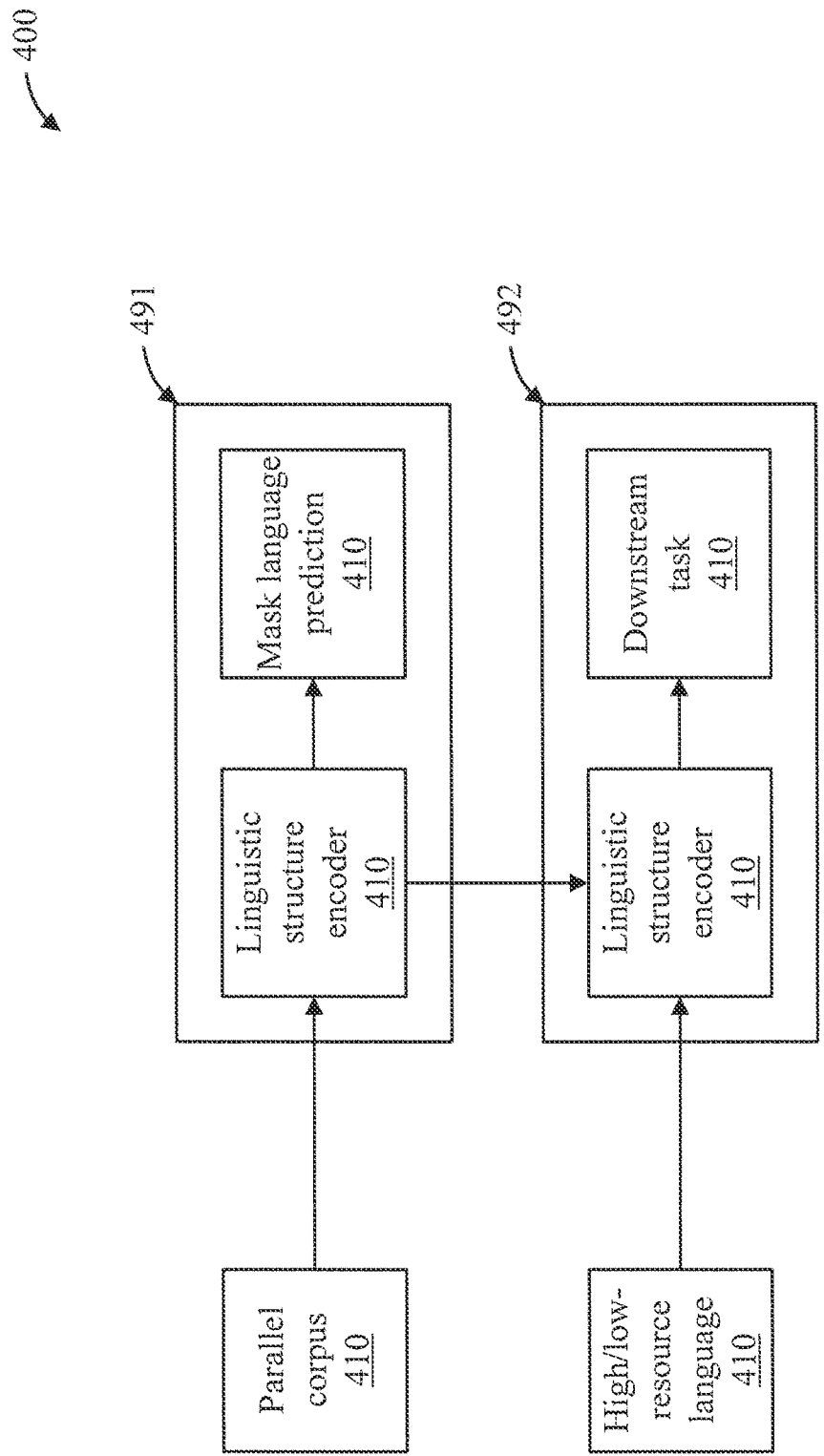
FIG. 4 is a block diagram showing an overview of a model, in accordance with an embodiment of the present invention.

FIG. 4 is a block diagram showing an overview of a model 400, in accordance with an embodiment of the present invention.

The model 400 includes a parallel corpus 401, a linguistic structure encoder 402, a mask language prediction block 403, a high/low-resource language block 404, a linguistic structure encoder 405, and a down-stream task block 406.

The linguistic structure encoder 402 and the mask language prediction block 403 corresponds to a pre-training phase 491.

The linguistic structure encoder 405 and the down-stream task block 406 correspond to a fine-tuning phase 492.

The linguistic structure encoder 402 and 405 is a graph-based language encoder to represent the natural language in its dependency linguistic relations. We pre-train the encoder 402 by Mask Language Prediction task in parallel corpus and then fine-tune the encoder 405 in the high/low resource languages for downstream tasks such as Natural Language Inference (NLI) and Named Entity Recognition (NER).

Figure 5:
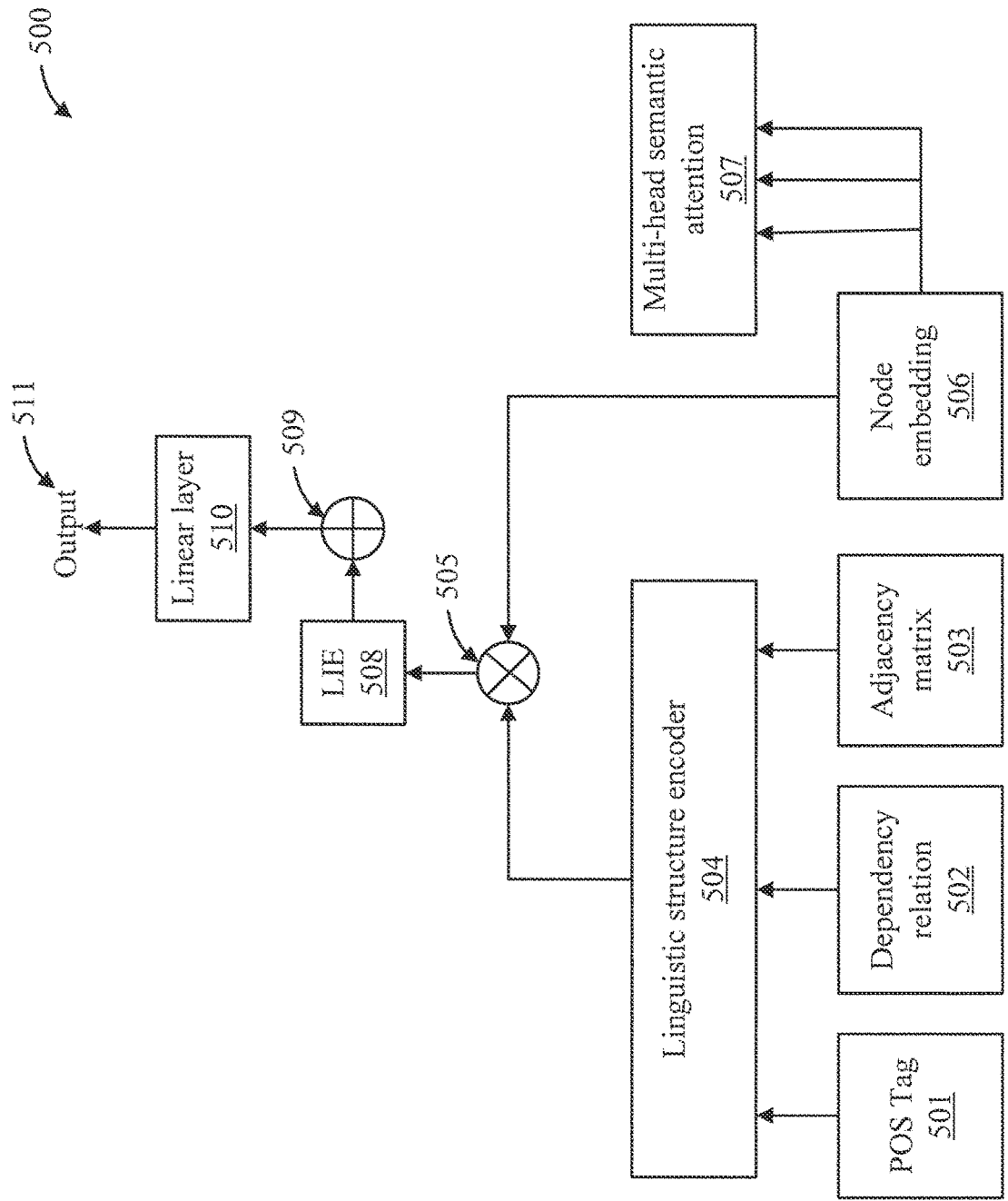
FIG. 5 is a block diagram showing an exemplary encoder structure of the linguistic structure encoders of FIG. 4, in accordance with an embodiment of the present invention.

FIG. 5 is a block diagram showing an exemplary encoder structure 500 of the linguistic structure encoders of FIG. 4, in accordance with an embodiment of the present invention. The encoder structure includes a POS tag 501, a dependency relation 502, an adjacency matrix 503, a linguistic dependency attention block 504, a multiplier 505, a node embedding block 506, a multi-head semantic attention block 507, a Linguistically-Informed Embeddings (LIE) block 508, a concatenator 509, a linear layer 510, and an output 511.

POS tag 501 and dependency relation 502 are extracted from the dependency parsing tree of each natural language sentence. The POS tag represents the part-of-speech such as a noun and verb. The dependency relation shows the relation between two connected tokens. The graph connection information is represented by adjacency matrix 503. We use a pre-trained cross-lingual language model to represent the token semantics as node embedding 506. After combining the node embedding and the output of linguistic structure encoder, the linguistic-informed embedding 508 is used as the input of fully connected neural network layers 510 to generate the output.

Regarding the LIE 508, the following applies:

$$V^{LIE} = softmax_g\left(\frac{[m^{i \to j}]_{j \in N^*(i)}}{\sqrt{2d_p} + d_r}\right)V$$

where all variables except for V are part of a linguistic dependency attention,
N*(i): neighbors of node i including the node i itself, and
V: node embedding.

Regarding message passing, define the message from node i to node j as follows:

$$m^{i \to j} = \theta^T[W_p p_i \| W_p p_j \| W_r r_{ij}]$$

where
$p_i$ and $p_j$: POS tag embeddings for i-th and j-th token.
$r_{ij}$: embedding of dependency relation.

Figure 6:
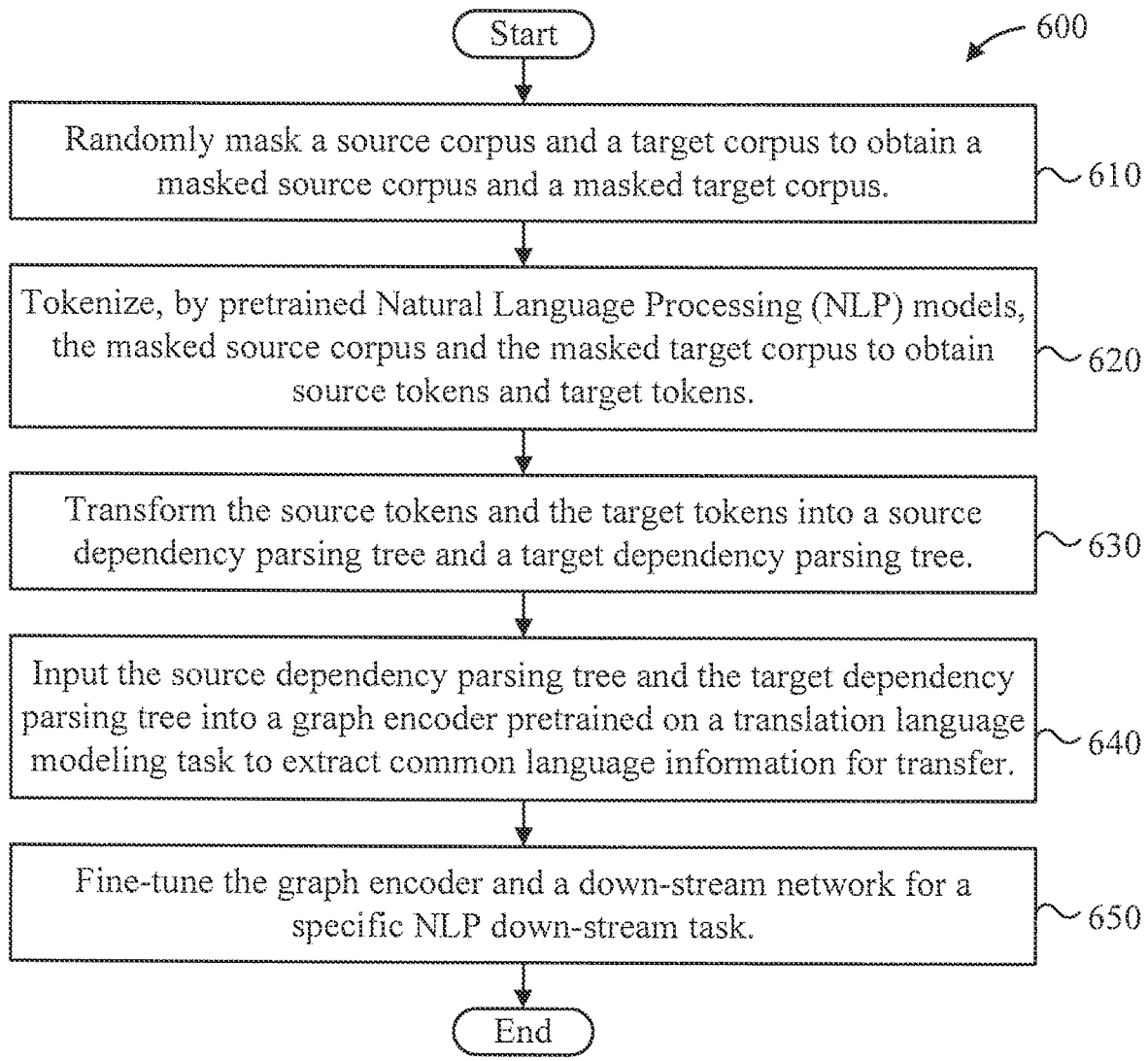
FIG. 6 is a flow diagram showing an exemplary method for cross-lingual transfer, in accordance with an embodiment of the present invention.

FIG. 6 is a flow diagram showing an exemplary method 600 for cross-lingual transfer, in accordance with an embodiment of the present invention.

At block 610, randomly mask a source corpus and a target corpus to obtain a masked source corpus and a masked target corpus.

At block 620, tokenize, by pretrained Natural Language Processing (NLP) models, the masked source corpus and the masked target corpus to obtain source tokens and target tokens.

At block 630, transform the source tokens and the target tokens into a source dependency parsing tree and a target dependency parsing tree.

At block 640, input the source dependency parsing tree and the target dependency parsing tree into a graph encoder pretrained on a translation language modeling task to extract common language information for transfer.

At block 650, fine-tune the graph encoder and a down-stream network for a specific NLP down-stream task.

The specific NLP down-stream task is then performed using the fine-tuned graph encoder and the down-stream network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention.

Having thus described aspects of the invention, with the details and particularity required by the patent laws, what is claimed and desired protected by Letters Patent is set forth in the appended claims.

What is claimed is:

1. A computer-implemented method for cross-lingual transfer, comprising:
    randomly masking a source corpus and a target corpus to obtain a masked source corpus and a masked target corpus;
    tokenizing, by pretrained Natural Language Processing (NLP) models, the masked source corpus and the masked target corpus to obtain source tokens and target tokens, the tokenizing comprising generating features of tree nodes including token representation by the pretrained NLP models, Part-Of-Speech (POS) tagging, and Universal Dependency (UD) relation;
    transforming the source tokens and the target tokens into a source dependency parsing tree and a target dependency parsing tree;
    inputting the source dependency parsing tree and the target dependency parsing tree into a graph encoder pretrained on a translation language modeling task to extract common language information for transfer, the graph encoder being configured for processing the dependency parsing trees by combining adjacency matrices of the dependency parsing trees with outputs of a preceding graph, and including two graph convolution layers with weights W1 and W2, and biases b1 and b2, generating outputs for the two graph convolution layers; and
    fine-tuning the graph encoder and a down-stream network for a specific NLP down-stream task, the fine-tuning including mask language prediction by concatenating the outputs for the two graph convolution layers, the outputs being utilized for the translation language modeling task by training as a filling-in-blank task where mask tokens are predicted by the modeling task based on their surrounding context.

2. The computer-implemented method of claim 1, wherein the source dependency parsing tree and the target dependency parsing tree comprise token representations by the pretrained NLP models, part of speech tagging, and universal dependency relations.

3. The computer-implemented method of claim 1, wherein the specific NLP down-stream task is Named Entity Recognition (NER).

4. The computer-implemented method of claim 1, further comprising training the graph encoder and down-stream network on high-resource languages and evaluated the graph encoder and the down-stream network on low-resource languages.

5. The computer-implemented method of claim 1, wherein the source corpus and the target corpus are written in respective natural languages.

6. The computer-implemented method of claim 1, wherein the graph encoder comprises a first graph convolutional layer and a second graph convolutional layer, and wherein outputs of the source corpus and the target corpus on the second graph convolutional layer are concatenated and masked tokens are predicted.

7. The computer-implemented method of claim 1, wherein each word in the source corpus and the target corpus are tokenized as respective tree nodes of the source dependency parsing tree and the target dependency parsing tree.

8. The computer-implemented method of claim 7, wherein at least fifteen percent of the source tokens and the target tokens are randomly masked.

9. The computer-implemented method of claim 1, wherein the cross-lingual transfer is from a high-resource language having a respective label for more than half of the words in the high-resource language to a low-resource language having a respective label for less than half of the words in the low-resource language.

10. A computer program product for cross-lingual transfer, the computer program product comprising a non-transitory computer readable storage medium having program instructions embodied therewith, the program instructions executable by a computer to cause the computer to perform a method comprising:
    randomly masking a source corpus and a target corpus to obtain a masked source corpus and a masked target corpus;
    tokenizing, by pretrained Natural Language Processing (NLP) models, the masked source corpus and the masked target corpus to obtain source tokens and target tokens, the tokenizing comprising generating features of tree nodes including token representation by the pretrained NLP models, Part-Of-Speech (POS) tagging, and Universal Dependency (UD) relation;
    transforming the source tokens and the target tokens into a source dependency parsing tree and a target dependency parsing tree;
    inputting the source dependency parsing tree and the target dependency parsing tree into a graph encoder pretrained on a translation language modeling task to extract common language information for transfer, the graph encoder being configured for processing the dependency parsing trees by combining adjacency matrices of the dependency parsing trees with outputs of a preceding graph, and including two graph convolution layers with weights W1 and W2, and biases b1 and b2, generating outputs for the two graph convolution layers; and
    fine-tuning the graph encoder and a down-stream network for a specific NLP down-stream task, the fine-tuning including mask language prediction by concatenating the outputs for the two graph convolution layers, the outputs being utilized for the translation language modeling task by training as a filling-in-blank task where mask tokens are predicted by the modeling task based on their surrounding context.

11. The computer program product of claim 10, wherein the source dependency parsing tree and the target dependency parsing tree comprise token representations' by the pretrained NLP models, part of speech tagging, and universal dependency relations.

12. The computer program product of claim 10, wherein the specific NLP down-stream task is Named Entity Recognition (NER).

13. The computer program product of claim 10, further comprising training the graph encoder and down-stream network on high-resource languages and evaluated the graph encoder and the down-stream network on low-resource languages.

14. The computer program product of claim 10, wherein the source corpus and the target corpus are written in respective natural languages.

15. The computer program product of claim 10, wherein the graph encoder comprises a first graph convolutional layer and a second graph convolutional layer, and wherein outputs of the source corpus and the target corpus on the second graph convolutional layer are concatenated and masked tokens are predicted.

16. The computer program product of claim 10, wherein each word in the source corpus and the target corpus are tokenized as respective tree nodes of the source dependency parsing tree and the target dependency parsing tree.

17. The computer program product of claim 16, wherein at least fifteen percent of the source tokens and the target tokens are randomly masked.

18. The computer program product of claim 10, wherein the cross-lingual transfer is from a high-resource language having a respective label for more than half of words in the high-resource language to a low-resource language having a respective label for less than half of words in the low-resource language.

19. A computer processing system for cross-lingual transfer, comprising:
   a memory device for storing program code; and
   a processor device operatively coupled to the memory device for running the program code, the processor device being configured for:
   randomly masking a source corpus and a target corpus to obtain a masked source corpus and a masked target corpus;
   tokenizing, by pretrained Natural Language Processing (NLP) models, the masked source corpus and the masked target corpus to obtain source tokens and target tokens, the tokenizing comprising generating features of tree nodes including token representation by the pretrained NLP models, Part-Of-Speech (POS) tagging, and Universal Dependency (UD) relation;
   transforming the source tokens and the target tokens into a source dependency parsing tree and a target dependency parsing tree;
   inputting the source dependency parsing tree and the target dependency parsing tree into a graph encoder pretrained on a translation language modeling task to extract common language information for transfer, the graph encoder being configured for processing the dependency parsing trees by combining adjacency matrices of the dependency parsing trees with outputs of a preceding graph, and including two graph convolution layers with weights W1 and W2, and biases b1 and b2, generating outputs for the two graph convolution layers; and
   fine-tuning the graph encoder and a down-stream network for a specific NLP down-stream task, the fine-tuning including mask language prediction by concatenating the outputs for the two graph convolution layers, the outputs being utilized for the translation language modeling task by training as a filling-in-blank task where mask tokens are predicted by the modeling task based on their surrounding context.

20. The computer processing system of claim 19, wherein the source dependency parsing tree and the target dependency parsing tree comprise token representations by the pretrained NLP models, part of speech tagging, and universal dependency relations.

* * * * *